April 15, 1941.    O. WITTEL    2,238,482
FOOTAGE INDICATOR FOR FILM HANDLING APPARATUS
Filed May 6, 1939
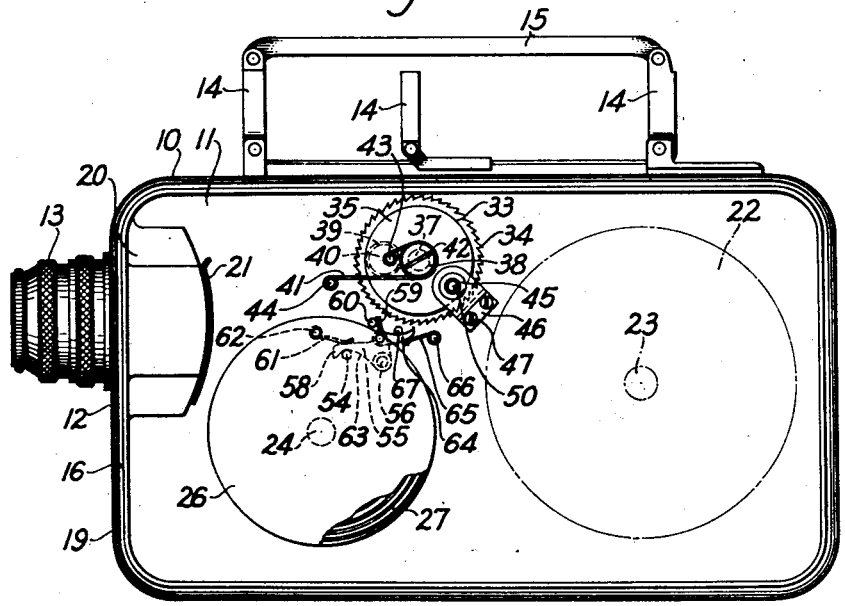
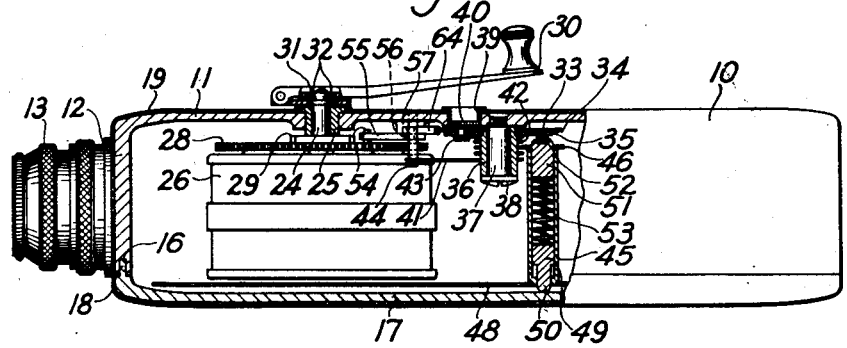
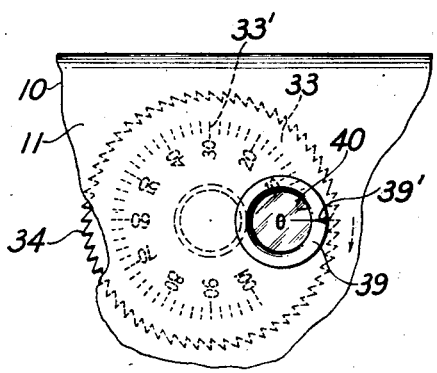
Otto Wittel
INVENTOR
BY
ATTORNEYS Patented Apr. 15, 1941

2,238,482

UNITED STATES PATENT OFFICE 2,238,482

FOOTAGE INDICATOR FOR FILM HANDLING APPARATUS

Otto Wittel, Rochester, N. Y., assignor to Eastman Kodak Company, Rochester, N. Y., a corporation of New Jersey Application May 6, 1939, Serial No. 272,253

5 Claims. (Cl. 88—16)

The present invention relates to a footage indicator for a film handling apparatus and more particularly to a footage indicator which is automatically returned to a predetermined position when the cover for the apparatus casing is removed.

Although automatically returnable footage indicators are already known, such indicators are of the gear driven type and require disconnection of the gear drive for automatic return of the indicator.

The primary object of the present invention is the provision of an intermittent engaging and advancing means for moving an indicating means and which is normally spaced therefrom so that automatic return of the footage indicator may be accomplished merely by removing the apparatus cover.

Another object of the invention is the provision of an intermittent advancing means for a footage indicator and of a resilient holding means which may prevent return of the footage indicator when held in operative position by closing of the casing cover and which is rendered inoperative upon opening of the casing cover to permit the automatic return of the footage indicator to its predetermined position.

A further object of the invention is the provision of an indicating member which is intermittently engaged and advanced by a ratchet type of advancing means including a pawl which is normally spaced from the indicating member but which is actuated to engage and advance the indicating member.

Other and further objects of the invention will be apparent to those skilled in the art from the following description.

The above and other objects of the invention are embodied in a film handling apparatus including a casing, a removable cover for enclosing said casing, an operating member carrying an abutment, an indicating means including a graduated member which is biased to return normally to a predetermined position, an advancing means normally spaced from said graduated member and intermittently moved by said abutment into engagement with said graduated member for step by step advancement thereof, and a holding means arranged to be moved by closing of said cover and to engage said indicating means to prevent the normal return of said graduated member and adapted when said cover is removed to permit the return of said graduated member to its predetermined position. Preferably the advancing means comprises a pawl assembly including a crank having a cam surface arranged to be operated intermittently by an operating member and a pawl pivoted to said crank and normally urged toward the teeth of said indicating member while a stationary guide member is located to engage and hold said pawl out of engagement with the graduated member but is so arranged that movement of the crank by said operating member renders said guide member inoperative whereupon the pawl is moved into engagement and to advance said indicating member.

Reference is hereby made to the accompanying drawing wherein similar reference characters designate similar elements and wherein:

Fig. 1 is a side elevation of a camera equipped with an automatic indicating means according to the invention.

Fig. 2 is a longitudinal transverse section through a film handling apparatus carrying an automatically returnable footage indicator.

Fig. 3 is a fragmentary side elevation of the side of the camera opposite to that shown in Fig. 1.

While the present disclosure illustrates the invention with respect to a motion picture camera, it is apparent that the automatic return for the footage indicator may be used on any type of film handling apparatus.

In the illustrated embodiment of the invention, the apparatus comprises a casing 10 having a side wall 11 and a lateral wall 12. An objective assembly 13 is mounted on the front portion of lateral wall 12 and a finder system 14 is mounted upon the top portion of lateral wall 12 and includes a handle 15. Said lateral wall 12 is provided around its outer edge with a groove 16, while the cover 17 carries a tongue 18 which fits into said groove 16 when the cover 17 is placed in closed position and which thereby forms a light-tight connection between said casing 10 and cover 17. Said casing 10 and cover 17 may be covered with a leather layer 19 or with any other suitable finish. Although no fastening means for the cover 17 are shown, it is to be understood that said cover 17 may be latched or otherwise detachably fastened to the casing 10 in any well known manner.

The camera casing 10 also contains a shutter housing 20 and a pressure pad 21 which together with the rear surface of housing 20 form a film gate. Film spools 22 are mounted in conventional fashion upon a spindle 23 also within casing 10.

The motive power for the apparatus is preferably derived from a spring motor assembly which comprises a shaft 24 journaled in a bushing 25 in the side wall 11 of casing 10. A motor housing 26 is journaled on shaft 24 and contains a spring 27 which as usual has one end attached to housing 26 and its other end attached to shaft 24. A driving gear 28 is mounted on motor housing 26 and a pawl 29 engages a ratchet wheel, not shown, on shaft 24 to prevent reverse movement thereof. A crank assembly includes a crank arm 30 which is provided with an opening 31 for engaging the flat sides 32 on the end of shaft 24. Such arrangement of the spring motor is well known and upon winding of crank arm 30 potential energy will be stored within the spring 27 of the motor assembly and which potential energy is dissipated by operation of the film operating and advancing mechanisms within the camera.

The indicating means according to the invention comprises a graduated member 33 having a toothed periphery 34, a disk 35 and a sleeve 36. Said graduated member 33 and disk 35 are attached to sleeve 36 which is rotatably mounted upon a spindle 37 fastened at one end to side wall 11 of casing 10. A screw 38 is threaded into the other end of spindle 37 and holds sleeve 36 thereon. A ferrule 39 is inserted into side wall 11, is provided with an index mark 39' and carries a transparent window 40 through which the graduated member 33 may be observed. Said graduated member 33 also is engraved with a series of footage numerals adjacent the graduations 33' and which in the instance shown range from "0" to "100."

Said indicating means or member is normally returned to a predetermined position by means of a spring member 41 and which preferably comprises a series of convolutions 42 loosely encircling sleeve 36 having one end fastened to disk 35 by a rivet 43 and having the other end fastened to a post 44 on side wall 11. Preferably the spring member just described is arranged normally to return the graduated member 33 to "0" position with the "0" graduation 33' in registry with the index mark 39', see Fig. 3.

A holding means selectively engages said indicating means or member to prevent its normal return to a predetermined position. Such a holding means may comprise a sleeve 45 supported at one end by a bracket 46 fastened to side wall 11 by screws 47 and supported at its other end in a side plate 48. A plunger 49 is mounted in the outer end of sleeve 45 and has a stem 50 for extending beyond side plate 48 and for engagement with the cover 17. A plunger 51 is mounted in the other end of sleeve 45 and carries a friction pad 52 for engaging the face of disk 35 of the graduated member. A coil spring 53 is placed within sleeve 45 between said plungers 49 and 51. Said coil spring 53 is designed so that when cover 17 is removed from casing 10 the stem 50 of plunger 49 is projected outwardly and friction pad 52 only lightly engages the face of disk 35 and spring member 41 can return the indicating member and graduated member 33 to its predetermined position. However, when cover 17 is placed in closed position stem 50 and plunger 49 are depressed and coil spring 53 is placed under such tension that the friction pad 52 on plunger 51 engages the face of disk 35 with sufficient friction to prevent the return of disk 35 and graduated member 33 to the normal or predetermined position by said spring member 41.

The advancing means for intermittently engaging and moving the indicating means is actuated by an abutment or pin 54 on motor housing 26. Said advancing means comprises a bell crank 55 pivotally mounted by a pin 56 to boss 57 on side wall 11. One arm of bell crank 55 carries a nose 58, while the other arm of bell crank 55 carries a projection 59 which may strike against a stop pin 60 on side wall 11. A spring arm 61 is mounted upon a stud 62 also on side wall 11. Said spring arm 61 urges bell crank 55 in a counter-clockwise direction as seen from Fig. 2 and moves projection 59 against stop pin 60 in which position the nose 58 is in the path or orbit of abutment 54. The engaged surface of bell crank 55, such as the arcuate surface 63, is arranged so that the time of contact between abutment 54 and nose 58 is reduced to a minimum. As a result, the possibility of the spring motor being stopped with abutment 54 in engagement with nose 58 is practically eliminated and in fact the release means of the camera may be arranged in a known manner so that the spring motor cannot be stopped under tension with the abutment 54 in engagement with nose 58.

The advancing means also includes a pawl assembly which comprises a pawl 64 pivoted to said other arm of bell crank 55. A second spring arm 65 is mounted on a stud 66 on side wall 11 and bears against pawl 64 normally to urge it against a stationary guide pin 67 on said side wall 11. Said guide pin 67 is located so that in normal position of bell crank 55 the pawl 64 is spaced from the toothed periphery 34 of graduated member 33. Thus at any time upon removal of the cover 17 said pawl 64 will not interfere with the normal return by spring member 41 of the graduated member 33 to its predetermined position.

When the abutment 54 engages nose 58 of bell crank 55, said pawl 64 is moved with respect to guide pin 67 and under the influence of spring arm 65 is directed toward and into engagement with the toothed periphery 34 to advance graduated member 33. The movement of bell crank 55 by abutment 54 is also sufficient to advance said toothed periphery 34 a distance which is more than the pitch of one tooth but less than the pitch of two teeth thereon. Accordingly, operation of the spring motor and rotation of motor housing 26 will cause intermittent actuation of bell crank 55 by abutment 54 and intermittent engagement and advancement of the toothed periphery 34 of graduated member 33 by the pawl 64.

By virtue of the construction above described it will be apparent that each time that the cover 17 is removed from the camera the footage indicator or graduated member 33 thereof will be returned to a "0" or predetermined position. However, when the cover 17 is replaced or placed in closed position the stem 50 and plunger 49 will be depressed to place sufficient tension on coil spring 53 so that friction pad 52 engages the face of disk 35 and prevents such normal return of graduated member 33 to its predetermined position under the influence of spring member 41. As a result the total advancement of the toothed periphery 34 and graduated member 33 is now maintained because of the holding action of the friction pad 52.

Since other arrangements of the automatic return for a footage indicator are possible without departing from the scope of the present invention, the present disclosure is to be construed in an illustrative sense. The scope and ambit of the invention is defined in the following claims.

Having now particularly described my invention what I desire to secure by Letters Patent of the United States and what I claim is:

1. In a film handling apparatus, the combination with a casing, a cover for enclosing said casing and removable therefrom, an operating member carrying an abutment, and an indicating means including a graduated member which is biased to return normally to a predetermined position, of an advancing means normally spaced from said graduated member and intermittently moved by said abutment into engagement with said graduated member for step by step advancement thereof, and a holding means between said cover and said indicating means, including a friction member movably mounted adjacent said graduated member, and a spring member located to be compressed by closing of said cover and for directly pressing said friction member against said graduated member to prevent said normal return thereof but arranged to be released upon removal of said cover to reduce the pressure of said friction member against said graduated member and to permit the normal return of said graduated member to said predetermined position.

2. In a film handling apparatus, the combination with a casing, a cover for enclosing said casing and removal therefrom, an operating member mounted for rotation and carrying an abutment, an indicating member having a plurality of teeth and carrying a graduated dial, and a spring member connected to said indicating member for returning the same and said dial to a predetermined position, of an advancing means located to be intermittently actuated by said abutment and including a pawl normally spaced from said indicating member but moved into engagement with the teeth thereof by the action of said abutment, and a holding means comprising a plunger having one end located to be operated by closing of said cover, a friction pad located to engage said indicating member, and a spring member placed under tension by said plunger and urging said friction pad against said indicating member to prevent normal return thereof to said predetermined position.

3. In a film handling apparatus, the combination with a casing, a removable cover for enclosing said casing, a rotatable operating member carrying an abutment, and an indicating member rotatably mounted, having a lateral face and a toothed periphery and carrying a graduated dial, and a spring member connected to said indicating member and for returning the same to a predetermined position, of a ratchet advancing means located to be intermittently actuated by said abutment and including a pivoted pawl, a friction holding means including a plunger having one end located to be displaced by said cover in its closed position, a friction pad located frictionally to engage the lateral face of said indicating member, and a spring member between said plunger and pad, placed under sufficient tension by displacement of said plunger by said cover to move said friction pad into holding engagement with said lateral face, and a stationary guide member located to engage and space said pawl from the toothed periphery of said indicating member and around which said pawl moves upon actuation of said crank for movement into advancing engagement with the toothed periphery of said indicating member.

4. In a film handling apparatus, the combination with a rotatable operating member carrying a projection, an indicating member rotatably mounted, having a toothed periphery and carrying a graduated dial, and a holding means engaging said indicating member to prevent free rotation thereof, of a pawl assembly including a pivotally mounted crank having a protuberance normally moved into the path of said projection, and a pawl pivoted to said crank and normally urged toward the toothed periphery of said indicating member, and a stationary guide pin located to engage and hold said pawl in spaced relation to said toothed periphery of the indicating means and around which the pawl is moved and into advancing engagement with said toothed periphery when said crank is pivoted by said projection on the operating member.

5. In a film handling apparatus, the combination with a casing provided with a window, a cover for enclosing said casing, a spring motor rotatably mounted in said casing and carrying a pin, an indicating means comprising a graduated member rotatably mounted opposite said window and a spring member for returning said graduated member to a predetermined position, and a holding means including a resilient plunger located to be operated by closing of said cover and carrying a friction pad which is pressed against said graduated member to prevent the normal return thereof to said predetermined position, of an advancing means comprising a bell-crank pivoted to said casing, a spring acting upon said bellcrank to move one arm of said bellcrank into the path of said pin for movement thereby, a pawl pivoted to the other arm of said bellcrank, a stud on said casing, and a second spring urging said pawl against said stud which is located to hold said pawl out of engagement with said graduated disk.

OTTO WITTEL.